Oct. 28, 1969  J. B. BUICE ET AL  3,475,659
SELF-HEALING CAPACITOR ASSEMBLY
Filed April 19, 1967
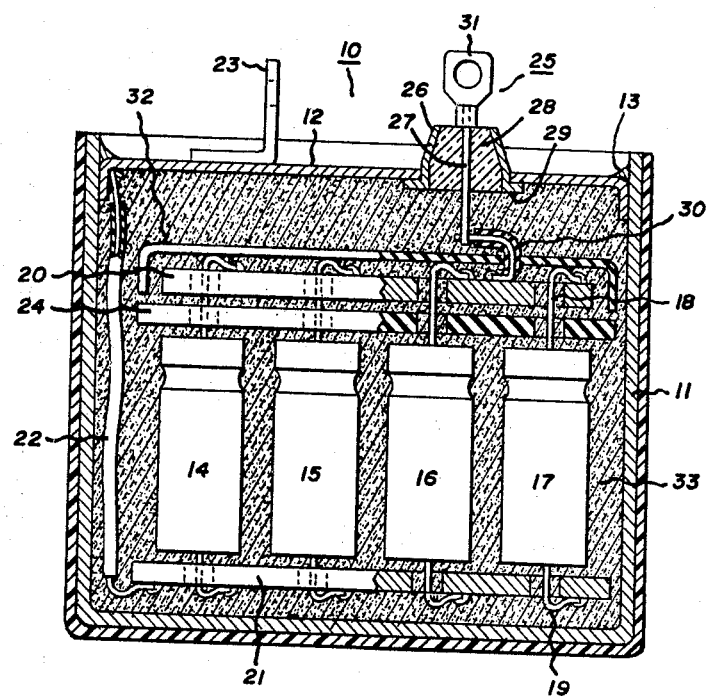
INVENTORS:
JOEL B. BUICE,
HENRY T. CANNON, JR.
BY
THEIR ATTORNEY.

United States Patent Office 3,475,659
Patented Oct. 28, 1969

3,475,659
SELF-HEALING CAPACITOR ASSEMBLY
Joel B. Buice, Columbia, and Henry T. Cannon, Jr., Newberry, S.C., assignors to General Electric Company, a corporation of New York
Filed Apr. 19, 1967, Ser. No. 632,048
Int. Cl. H01g 9/08
U.S. Cl. 317—230           10 Claims

ABSTRACT OF THE DISCLOSURE

This invention includes discrete capacitors arranged as elements in a packaged relationship in a hermetically sealed housing. Each individual anodic connection from the capacitors through the housing are of a valve metal taken from one of the metals of Group IV–B and V–B of the periodic table of elements. In the event of electrolyte contact with any anodic and cathodic connection, the anodic materials will form a protective oxide, when an electric potential is present, by the passage of current between these conductors.

---

This invention relates to a self-healing capacitor and more particularly to a package assembly of individual and discrete capacitors disposed in a hermetically sealed housing where the internal housing electrical connections to the individual capacitors have self-healing characteristics.

In many electrical applications for electrolytic capacitors there is a need for greater energy storage capacities. In order to meet this need, packaging techniques are employed where plural individual and discrete capacitor components are combined in one package assembly to obtain greater energy storage capabilities. One example of the foregoing is the combination of a plurality of liquid electrolyte type capacitors which are disposed within a hermetically sealed housing and which are electrically connected together therein. In this kind of capacitor package, liquid electrolyte may leak from any of the individual and discrete capacitors in the hermetically sealed package as a result of a defective capacitor seal, temporary or permanent misapplication of voltage or temperature, or through the normal and expected rate of electrolyte transmission. In instances where the housing is not hermetically sealed, the loss of electrolyte from the individual capacitors may be greatly accelerated, particularly under lower pressure or vacuum conditions. In addition, subjecting of the package assembly to some forms of radiation may result in degrading of the seals in seal materials employed, increasing the likelihood of electrolyte leakage within the package assembly. Electrolyte leakage in the package assembly may lead to failure of one or more individual capacitors or the entire assembly. Failures ordinarily occurring because of electrolyte leakage result from electrical shorting of leads, current leakage, arcing, excess heating, corrosion of leads, and corrosion of seals permitting excessive electrolyte loss.

There is a need to have some protective means associated with metal parts in contact with or which may come in contact with electrolyte by which the metal becomes impervious to the electrolyte and or develops self-sealing or healing means with respect to electrical insulation. Accordingly, it is an object of this invention to provide an improved self-healing capacitor package assembly.

It is another object of this invention to provide an improved self-healing capacitor package assembly in a hermetically sealed housing.

It is a further object of this invention to provide a self-healing capacitor package assembly in a hermetically sealed housing where the anode leads or connectors passing from individual capacitors to the housing are of a film forming valve metal.

It is a further object of this invention to provide, in a self-healing package capacitor assembly incorporated in a hermetically sealed housing, all internal anode connections of a film forming valve metal including the metallic feedthrough a glass-to-metal seal for the anode connection passing through the housing wall.

Briefly described, this invention in one of its preferred forms includes a hermetically sealed housing or member incorporating therein a plurality of individual and discrete liquid electrolyte porous anode type capacitors. These capacitors are interconnected within the hermetically sealed housing by means of electrical anode connecting means formed of a valve or film forming metal, for example, tantalum, zirconium, niobium or titanium. The anode connection brought out through the hermetically sealed housing includes a glass-to-metal seal wherein the metal is also a film forming metal. Any electrolyte leakage within the hermetically sealed housing which comes in contact with anode and cathode connections, which include leads and connectors, provides an anodizing arrangement whereby the electrical connections become self-healing by generating an electrically non-conducting oxide film thereon.

This invention will be better understood when taken in connection with the following description and drawing in which:

The single figure of drawing is a cross-sectional view of one preferred embodiment of this invention.

Referring now to this figure, there is illustrated a capacitor package assembly 10 in accordance with the teachings of this invention. Assembly 10 includes a housing member 11 which may be a metal formed of various metal and non-metal materials but which, in one working example, is cold rolled steel. Such a housing may be suitably coated with a further metal such as a solder metal. Housing 11 may also be of any desired configuration such as cylindrical, rectangular, parallelepiped etc. and combinations thereof, and as illustrated in FIGURE 1, cubical. Housing 11 also includes a cover 12 which is hermetically sealed to the housing 11 by means of a suitable solder seal 13 at the periphery thereof. Cover 12 in one example was brass, suitably coated with a solder metal as described for housing 11. Included within housing 11 are a plurality of individual and discrete capacitors 14, 15, 16 and 17. These individual capacitors usually comprise a sealed outer casing including therein a liquid or gelled liquid electrolyte and a porous anode.

Examples of the kind of individual and discrete capacitors referred to are found in U.S. Patents 3,255,390, Ruscetta et al., and 3,223,899, Mohler et al., each assigned to the same assignee as the present invention. One example of a plurality of individual and discrete capacitors incorporated in a housing or package is disclosed in U.S. Patent 3,239,595, Reese et al., assigned to the same assignee as the present invention.

Each individual capacitor element 14, 15, 16 and 17 may be similar in all respects. Capacitor 17 for example, includes a suitable anode lead or connector 18 projecting from one end of capacitor 17, and a cathode lead 19 projecting from the opposite end of capacitor 17. Each anode lead 18 is connected to a common terminal member 20, for example, by welding and each cathode lead 19 is connected to a further common terminal member 21, also by welding. Terminal members 20 and 21 are disposed transversely across the respective anode and cathode ends respectively of the individual capacitors. These terminal members 20 and 21 have sufficient stiffness to provide, through the welded connection, a positioning means to retain capacitor elements 14, 15, 16 and 17 in their desired and illustrated spaced arrangement.

A further cathode lead 22 is connected to the common terminal 21 and progresses upwardly in the casing to connect, for example, by welding or soldering, to the cover 12. Lead 22 is preferably of the insulated type, including a well known insulating cover or coating, such as Teflon sleeving material, as illustrated. A cathode connector in the form of an angle member 23 is suitably attached, as for example, by welding to the cover 12, to provide the external cathode connection to each of the capacitor elements 14, 15, 16 and 17 disposed within casing 11.

In a preferred embodiment of this invention all anode leads or connectors are made with a valve metal, for example, those metals of Group IV-B and V-B of the periodic table of elements, particularly, tantalum, titanium, ziconium and niobium. Specific examples of this invention have utilized tantalum metal of 99.9% purity for all anode leads and connectors, and substantially pure nickel for all cathode leads and connectors. In FIGURE 1, for example, leads 18, for each of the capacitor elements 14, 15, 16 and 17, are preferably of tantalum and are attached as by welding to a common tantalum terminal member 20. Leads 19 and 22 as well as terminal member 21 may also be of a similar or different film forming metal. However, a valve metal for cathodic leads and connectors is not necessary. Accordingly, for example, leads 19, 22 and member 21 are of substantially pure nickel. In one embodiment of the invention capacitor cases of capacitors 14, 15, 16 and 17 were of silver. The attachment of leads 18 to terminal member 20 and leads 19 to terminal member 21 also provides the proper positioning and spacing of the capacitor elements 14, 15, 16 and 17 within the casing 11. A suitable insulator 24 is also disposed across the anode ends of the capacitors 14, 15, 16 and 17 to provide electrical insulation between the individual capacitor housings and terminal 20.

The anode connection through the cover 12 is in the form of a glass-to-metal seal following the general principles and practice as described in U.S. Patent 3,275,901, Merrit et al., assigned to the same assignee as the present invention. More particularly, anode connection 25 includes a hollow frusto conical member 26 surrounding and spaced from a central film forming metal conductor 27 projecting therethrough. A suitable electrical non-conducting ceramic material 28 such as a glass or other insulating composition fills the cone member 26 to hermetically seal the conductor 27 in cone 26 and electrically insulate conductor 27 from cone 26.

Conical member 26 is of a solderable or brazeable material such as nickel-iron alloy and includes a flange portion 29 at the base end thereof. Cone member 26 is positioned in a suitable aperture in cover 12 so that flange 29 abuts cover 12 for a braze joint. Conductor member 27 projects into housing 11 at one end and is electrically connected to terminal 20, preferably by utilizing a short insulated lead 30 of, for example, tantalum welded to both connector 27 and terminal 20. At the other or external end of conductor member 27, a suitable solderable connector 31 is provided to facilitate further electrical connection. The combination of the braze joint at flange 29 and cover 12, and glass seal 28 provides a hermetically sealed cover for housing 11. If desirable, a further insulating member 32 may be employed to electrically insulate terminal 20 from adjacent members.

In assembly of the package, all film forming metals are pre-anodized and the capacitors are electrically connected. At this point, a measured amount of a filler compound, for example an epoxy resin 33, is disposed in housing 11, the connected capacitors are positioned in the housing as illustrated, more epoxy resin is added, and cover 12 is then sealed to the housing for hermetically sealed assembly. Thereafter epoxy resin 33 is cured at elevated temperatures to produce hardening and added mechanical strength and integrity of the completed assembly. In FIGURE 1 epoxy resin 33 is illustrated in part only for the sake of clarity. Epoxy resin may be employed in varying amounts including substantially filling housing 11.

The primary disadvantage of former packaging arrangements not utilizing the teachings of this invention is the leakage tendency, and resultant occurrences of electrical shorts as a result of leaking electrolyte forming a conductive bridge between any anodic and any cathodic junction or termination of the assembly. The individual capacitor seals, as well as the housing seal, are degraded by resulting arcs and high leakage current. This condition produces excessive internal heating and the inevitable failure of the entire energy cell. In the invention as described, the electrolyte leakage may cause the electrolyte to contact anodic and cathodic connections generally, including leads and connectors, but because of the electrical potential present, these materials will form a protective oxide and the entire energy package possesses self-healing properties and will continue to function as intended. Therefore, a primary advantage of this invention over prior art devices is the ability of the entire energy cell to be self-correcting and self-healing, characteristics which are similar to those internally in individual liquid electrolyte capacitors.

While this invention has been disclosed with respect to particular embodiments thereof, numerous modifications may be made by those skilled in the art without departing from its true spirit and scope. Therefore, it is intended that the appended claims cover all such modifications and variations which come within the true spirit and scope of the present invention.

What is claimed as new and desired to be secured by Letters Patent of the United States is:

1. A self-healing capacitor assembly comprising in combination:
    (a) a hermetically sealed housing,
    (b) a plurality of self-healing discrete capacitor elements in said housing, each of said capacitor elements in said housing including:
        (1) a sealed capacitor casing,
        (2) an electrolyte in said casing,
        (3) an anode in said casing,
        (4) anode and cathode connectors projecting from said capacitor casing and adapted to be connected respectively to said anode and to a cathode,
    (c) said anode connectors being of a film-forming valve metal, and
    (d) an anode conductor member passing through said housing and connecting respectively with said connectors of each of said discrete capacitor elements.

2. The invention as recited in claim 1, each of said anode connectors consisting essentially of a film-forming valve metal, a common anode electrical terminal in said housing connected to said plurality of anode connectors, said common anode terminal being of a film-forming valve metal, said anode conductor member passing through said housing and being connected to said common anode terminal.

3. The invention as recited in claim 2, further including a ceramic-to-metal seal in said housing, said seal having a ceramic member insulating said conductor member from said housing, said conductor member consisting essentially of a film-forming valve metal.

4. The invention as recited in claim 3, further including a common cathode terminal within said casing and connected to said housing, means connecting said cathode connectors to said common cathode terminal, said common cathode terminal being of a metal other than said film-forming valve metal.

5. The invention as recited in claim 3, said film-forming valve metal consisting essentially of tantalum.

6. A capacitor assembly comprising in combination:
    (a) a metallic hermetically sealed housing,
    (b) a plurality of discrete capacitors in said housing, arranged in a stacked array, (c) each of said capacitors in said housing including:
  (1) a sealed metallic capacitor casing,
  (2) a liquid electrolyte in said casing,
  (3) a porous anode in said casing in contact with said electrolyte,
  (4) anode and cathode lead connectors projecting from and connected to said anode and said casing respectively,
  (5) said anode lead connectors being of a film-forming valve metal,
  (6) a common anode terminal within said housing connected with said anode lead connectors,
  (7) said common anode terminal being of a film-forming valve metal,
  (8) a common cathode terminal in said housing connected to said cathode lead connectors,
  (9) said common cathode terminal being electrically connected to said housing,
(d) film-forming metal anode conductor means connecting said common anode terminal externally of said casing to said anode connector,
(e) a flange member mounted on a wall of said housing and forming an aperture surrounding said anode conductor,
(f) a glass sealing composition within said flange member hermetically sealing said conductor in said flange member, and means hermetically sealing said flange member to said housing.

7. The invention as recited in claim 6, said film-forming valve metal consisting essentially of tantalum.

8. The invention as recited in claim 6, further including a potting compound within said housing.

9. The invention as recited in claim 8, said potting compound comprising an epoxy resin.

10. The invention as recited in claim 9, said casing comprising cold rolled steel, each of said anodic connectors in said housing consisting essentially of tantalum, and said cathodic connectors in said housing consisting essentially of nickel.

References Cited
UNITED STATES PATENTS

| | | | |
|---|---|---|---|
| 2,862,155 | 11/1958 | Bubriski | 317—230 |
| 3,046,457 | 7/1962 | Scholte | 317—230 |
| 3,275,901 | 9/1966 | Merritt et al. | 317—230 |
| 3,346,783 | 10/1967 | Millard | 317—230 |
| 3,396,315 | 8/1968 | Stokes | 317—230 |

JAMES D. KALLAM, Primary Examiner

U.S. Cl. X.R.
317—234, 242